(12) United States Patent
Billen

(10) Patent No.: US 6,412,357 B2
(45) Date of Patent: Jul. 2, 2002

(54) MOTOR VEHICLE SEAT WITH INTEGRATED OCCUPATION DETECTOR

(75) Inventor: Karl Billen, Körperich (DE)

(73) Assignee: I.E.E. International Electronics & Engineering S.a.r.l., Luxembourg (LU)

( * ) Notice: Subject to any disclaimer, the term of this patent is extended or adjusted under 35 U.S.C. 154(b) by 0 days.

(21) Appl. No.: 09/805,945

(22) Filed: Mar. 15, 2001

Related U.S. Application Data

(63) Continuation of application No. PCT/EP99/06694, filed on Sep. 10, 1999.

(51) Int. Cl.$^7$ .................................................. G01L 1/04
(52) U.S. Cl. ............................ 73/862.637; 73/862.627
(58) Field of Search ...................... 73/892.391, 862.451, 73/862.471, 862.627, 862.636, 862.637

(56) References Cited

U.S. PATENT DOCUMENTS

| | | | |
|---|---|---|---|
| 5,481,078 A | | 1/1996 | Asche |
| 5,971,432 A | * | 10/1999 | Gagnon et al. ............. 280/735 |
| 5,991,676 A | | 11/1999 | Podoloff et al. |
| 6,092,838 A | * | 7/2000 | Walker ....................... 280/735 |
| 2001/0018849 A1 | * | 9/2001 | Bruns .................... 73/862.391 |

FOREIGN PATENT DOCUMENTS

| | | |
|---|---|---|
| EP | 0 670 239 | 9/1995 |
| WO | WO 98 25112 | 6/1998 |
| WO | WO 00/16054 | 3/2000 |

OTHER PUBLICATIONS

Form PCT/IPEA/416 (Notification of Transmittal of the International Preliminary Examination Report (PCT/EP99/06694).

Form PCT/IPEA/409 (International Preliminary Examination Report) (PCT/EP99/06694) in the French language with attached English language translation of the Annex (i.e., the specification and claim replacement pages presented during the International stage).

International Search Report for PCT/EP99/06694.

Form PCT/IB/308 (Notice Informing The Applicant of the Communication of the International Application to the Designated Offices) (PCT/EP99/06694).

* cited by examiner

*Primary Examiner*—Max Noori
(74) *Attorney, Agent, or Firm*—Smith, Gambrell & Russell

(57) ABSTRACT

A motor vehicle seat with integrated occupation detector is featured having an upper frame, which supports seat upholstery or a seat shell, and a lower frame, which is secured in the vehicle, and mechanical mounting elements to support the upper frame in the lower frame. The mounting elements are designed in such a way that they are deformed elastically under the weight of a seat user, the occupation detector comprising at least one measuring pick-up, which measures the elastic deformation of the mounting elements.

29 Claims, 3 Drawing Sheets

MOTOR VEHICLE SEAT WITH INTEGRATED OCCUPATION DETECTOR

Figure 1:
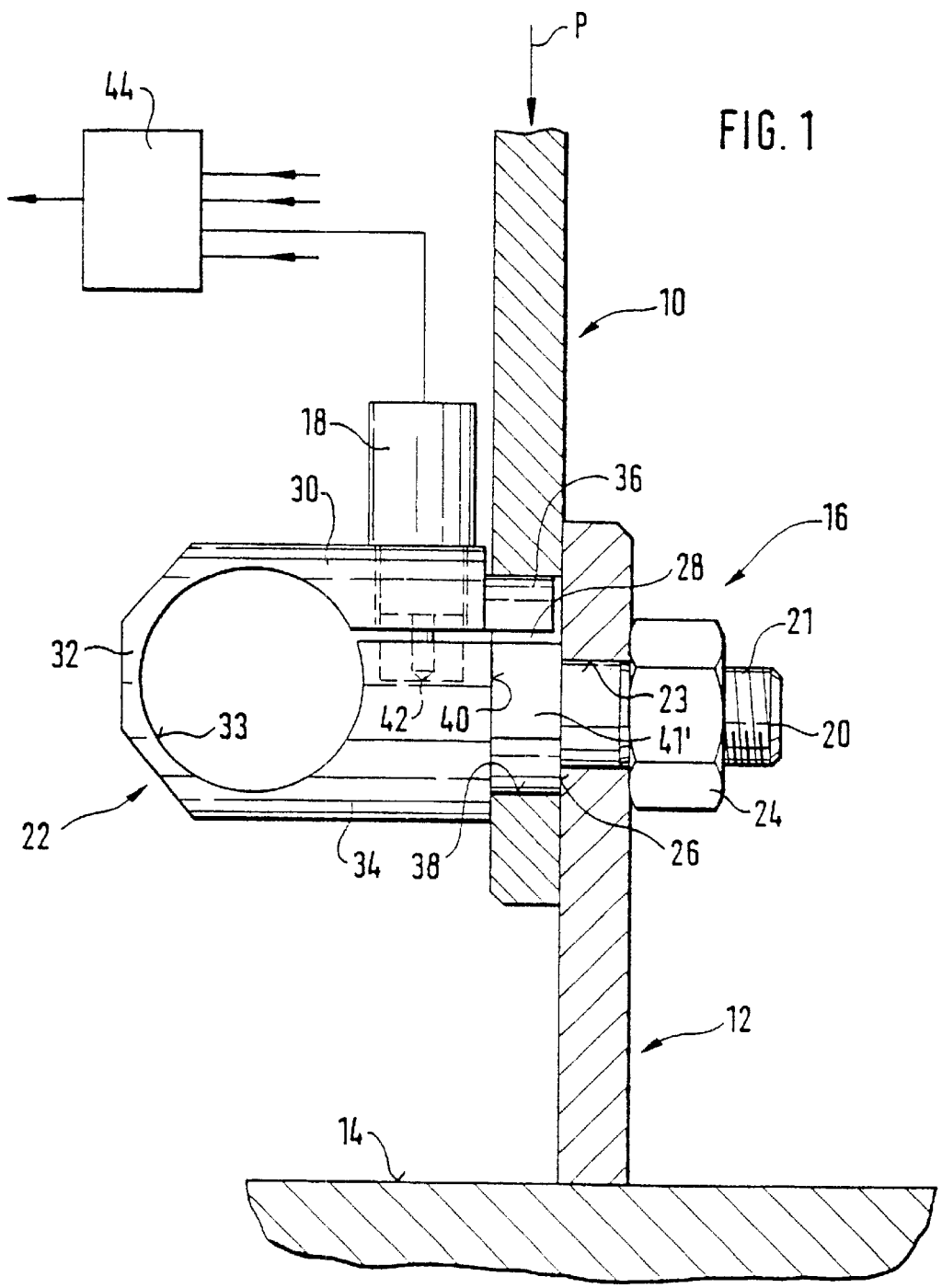

This application is a continuation of International Application No. PCT/EP99/06694, filed Sep. 10, 1999 entitled MOTOR VEHICLE SEAT HAVING AN INTEGRATED OCCUPANCY DETECTION SYSTEM which is incorporated herein in its entirety by reference.

The invention relates to a motor vehicle seat with integrated occupation detector.

To protect the front-seat passenger in a vehicle in the event of an accident, an increasing number of motor vehicles are being equipped with a front-seat passenger airbag. To prevent unnecessary damage when this airbag is tripped, it should be tripped in an accident only if the front passenger seat is occupied.

Meanwhile a number of systems for detecting occupation of vehicle seats are known. For example, motor vehicle seats with a pressure-sensitive sensor mat integrated in the upholstery are known. To ensure satisfactory operation of these systems, these sensor mats must be taken into account in the design of the seat upholstery. In practice this may lead to difficulties, because the designer of the seat upholstery is confronted with new requirements, which additionally restrict his creative freedom.

There are likewise systems for detecting occupation of motor vehicle seats in which sensors are not installed in the seat upholstery. These are, for example, infra-red or ultrasonic sensors or inductive or capacitive sensors, all of which are mounted in the motor vehicle itself. However, these systems are regarded as more susceptible to faults than the systems directly integrated in the motor vehicle seat. In addition these systems are far more expensive than the pressure-sensitive systems.

The European patent application EP-A-0 670 239 describes a vehicle seat with occupation detector, in which an upper frame in the front area of the seat is tiltable on a lower frame of the seat. A leaf spring, which lifts the rear area of the upper frame when the seat is not occupied and is elastically deformed under the weight of the occupant, is arranged between the upper frame and lower frame of the seat. The displacement of the upper frame of the seat resulting from the deformation of the leaf spring is recorded by a measuring sensor and seat occupation thus concluded.

The document WO-A-98/25112 (D2) also describes a vehicle seat with an occupation detector. In this vehicle seat the upper frame lies flat at several points on the lower frame and is bolted to the latter. A force measuring sensor, which can measure the bearing force of the upper frame on the lower frame, is arranged between the upper frame and lower frame at each of the bolted connection points.

TASK OF THE INVENTION

The task of the invention is to propose a motor vehicle seat with an alternative simple, cheap and reliable occupation detector, in which the design of the seat upholstery is not affected by the occupation detector.

GENERAL DESCRIPTION OF THE INVENTION

According to the invention this problem is solved by a motor vehicle seat according to claim 1. Like most modern vehicle seats, a seat of this type comprises an upper frame, which supports seat upholstery or a seat shell, and a lower frame, which is secured in the motor vehicle, as well as mechanical mounting elements for supporting the upper frame in the lower frame and for introduction of a weight force from the upper frame into the lower frame. According to the invention these mounting elements are designed in such a way that they deform elastically, i.e. reversibly, under the weight of a seat user, the occupation detector still comprising at least one measuring sensor, which measures this elastic deformation directly or indirectly. In other words the mounting elements, which support the upper frame in the lower frame, are used as converters, which convert the weight of the seat user into a geometric variable measurable by a simple measuring sensor. These mounting elements thus permit a simple, reliable and low-cost occupation detector without the need to install a sensor in the seat upholstery. Furthermore, it should be noted that such a detector can be integrated easily in the seat and is extremely rugged. As wide scope exists for selection of the measuring sensor, the latter can be selected with consideration of specific requirements, which relate, for example, to the reliability, the temperature range or the electromagnetic compatibility. The cost of the measuring sensor and the electronic evaluator to be connected to it in series will certainly likewise play a role in the selection of the measuring sensor.

The measuring sensor may, for example, be a strain gauge, which is mounted on the mounting element in such a way that it directly measures its deformation (e.g. bending or torsion). However, the mounting elements are preferably designed in such a way that their elastic deformation causes vertical displacement between the upper frame and lower frame. Consequently the measuring sensor can be a displacement sensor, which measures this relative displacement in the vertical direction. As the amplitude of the displacement to be measured can easily be adapted in an optimum manner to the measuring range of a selected displacement sensor via the deformability of the mounting elements, extremely simple, inexpensive displacement sensors can be used. In the simplest case the displacement sensor may even be a simple switching element, which measures a relative vertical displacement between the upper frame and lower frame caused by the deformation of the mounting elements as the exceeding of a threshold value. If the switching element comprises several switching points, to which a predetermined threshold value is assigned, the vehicle occupant can even be classified in a specific weight category. This permits weight-dependent control of the airbag in the simplest way. A similar result can, of course, also be achieved by several switching elements, a predetermined threshold being assigned to each switching element.

The elastically deformable mounting element, which is realised in a motor vehicle seat according to the invention, may have many different embodiments. For example, it may be designed as a simple bolt, which is secured unsupported to one of the two frames and forms a support for the other frame. The bending of the bolt is then measured by the measuring sensor. However, a bolt of this type would have to be a certain length, so that a change in the dead weight on the seat can also be measured by simple measuring sensors. Multi-part mounting elements, in which separate spring elements (e.g. spring washers, leaf springs or spiral springs) are used, are also conceivable.

In a preferred embodiment the mounting element is designed as a stirrup with a first and second arm, the free end of the first arm being securely connected to one of the two frames and the free end of the second arm forming a support for the other frame. This stirrup is then designed in such a way that the opening width of the stirrup changes elastically under the weight of a seat user. (An additional weight preferably produces reduction of the opening width of the stirrup). In the area of the support the first stirrup arm is advantageously separated from the second stirrup arm by a gap. The opening width of this gap is preferably designed in such a way that the support rests on the first stirrup arm before plastic deformation of the stirrup takes place, so that the risk of continuous impairment of the function of the stirrup by overloading is clearly reduced.

In an advantageous embodiment of the stirrup the first and second stirrup arms are designed in such a way that they exhibit approximately the same bending deformation with vertical loading of the support. Consequently it is ensured that the support is displaced largely parallel with itself under the weight of a seat user (or in other words: the rotation on the support caused by the bending deformation is negligible). Consequently the risk of tilting of the parts movable in relation to each other is avoided.

An easily manufactured mounting element for the motor vehicle seat according to the invention comprises a shaft, which is clamped securely to one of the two frames, and a head arranged as an axial extension of the shaft, which forms a first shoulder area. A gap extends from this first shoulder area into the head. Consequently an unsupported arm, which forms at its free end a support for the other frame, is formed at the head, the opening width of the gap changing elastically under the weight of a seat user. A stirrup, the first arm of which is formed by the shaft and the connected part of the head and its second arm by the unsupported arm, is thus formed. The head advantageously has a quite large horizontal transverse hole, into which the gap terminates. This transverse hole is arranged and designed in such a way that a flexible stirrup element connecting the unsupported arm to a first arm, which is in turn rigidly connected to the shaft, is formed at the head end. However, the head may also have horizontal oblong holes, the gap terminating in one of these oblong holes. These oblong holes may advantageously be arranged in the head in such a way that the support is displaced largely parallel with itself in the vertical direction under the weight of a seat user.

With regard to the described mounting element it should be noted that its design can be particularly compact, if the head is offset in relation to the shaft, In an alternative embodiment the mounting element comprises a journal and a journal bearing. The journal is securely connected to one of the two frames and the journal bearing to the other frame. A spring device designed in such a way that the journal is vertically displaced elastically in relation to the journal bearing under the weight of a seat user, is arranged between the journal and the journal bearing. The journal bearing advantageously has a vertical guide slot for the journal. Horizontal forces are transmitted between the two frames in this guide slot without horizontal displacement of the two frames.

DESCRIPTION ON THE BASIS OF THE FIGURES

An embodiment of the invention will now be described below with reference to the enclosed figures.

Figure 2:
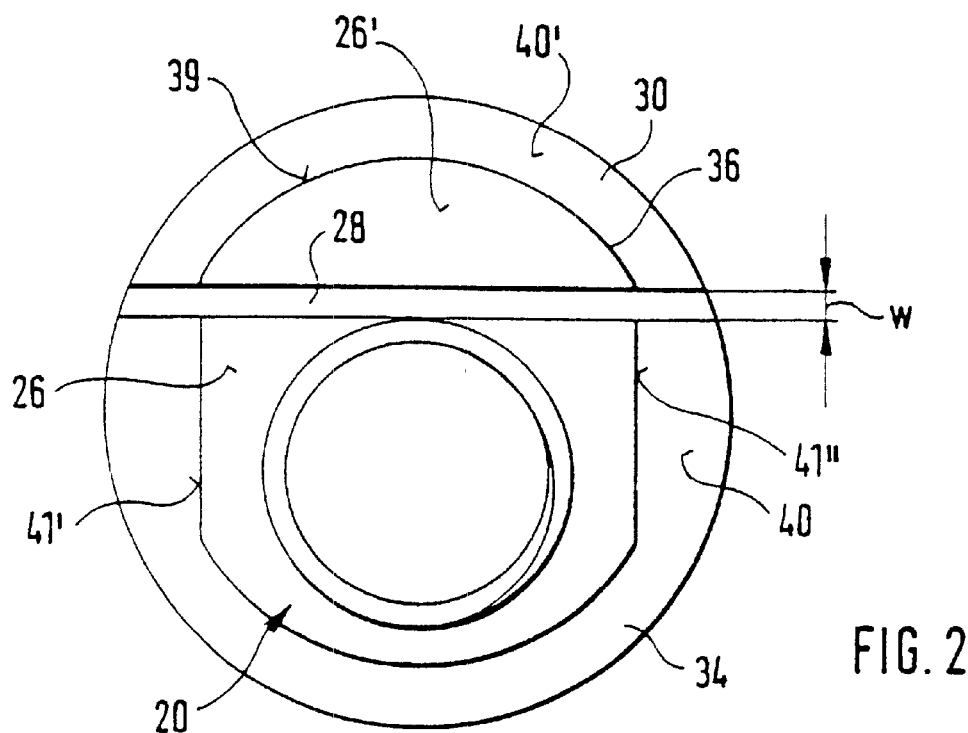
Figure 3:
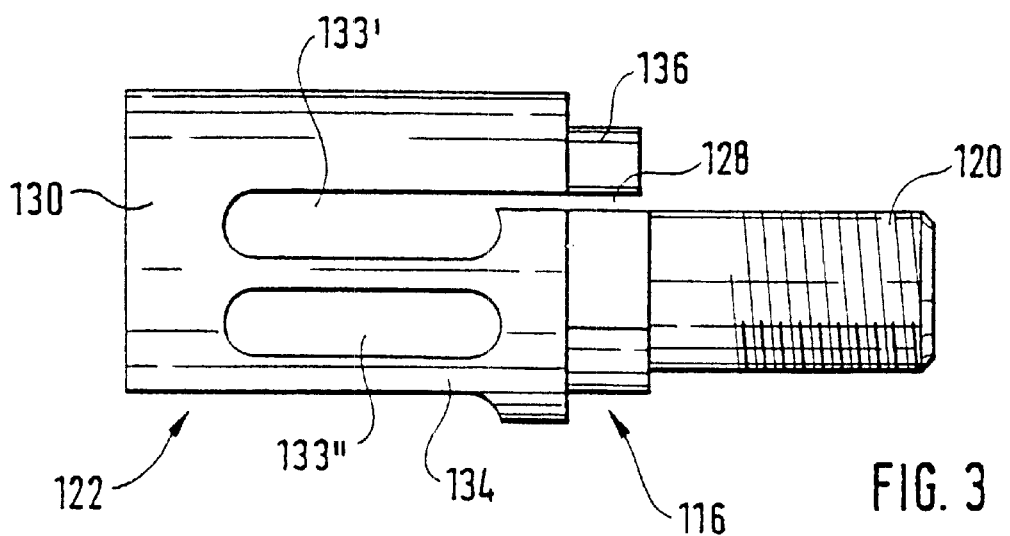
Figure 4:
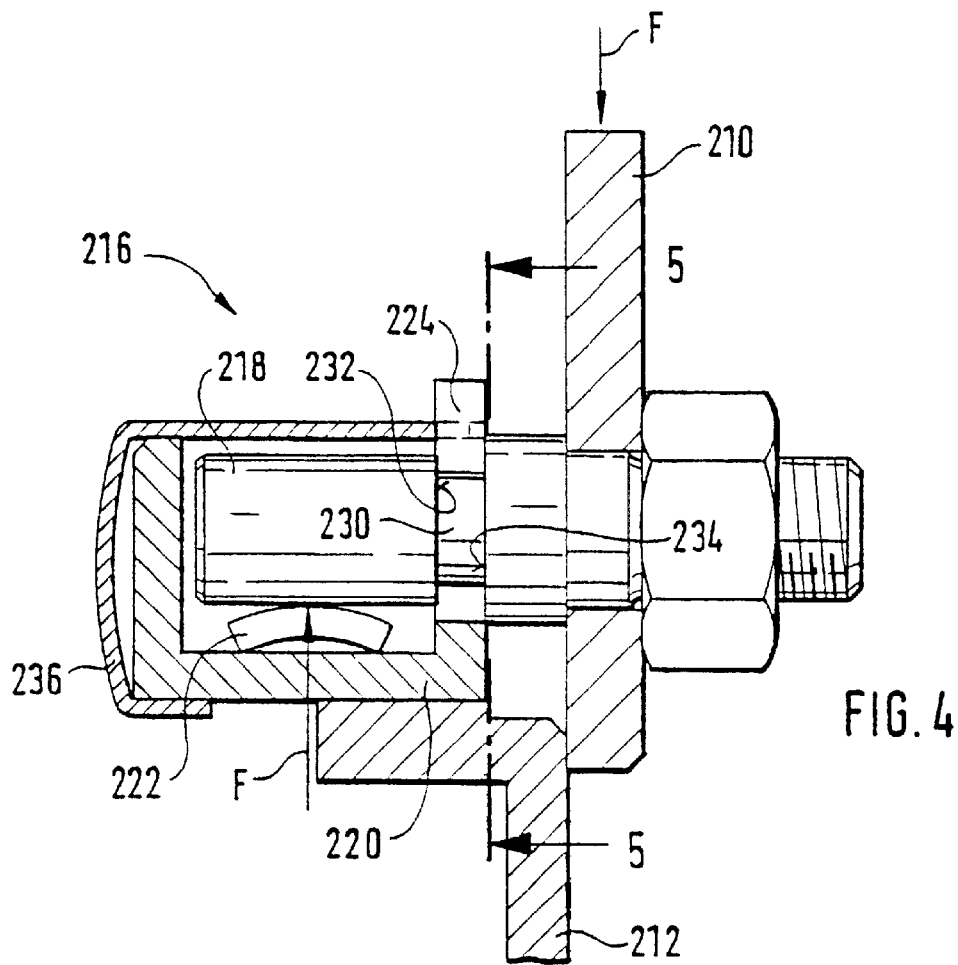
Figure 5:
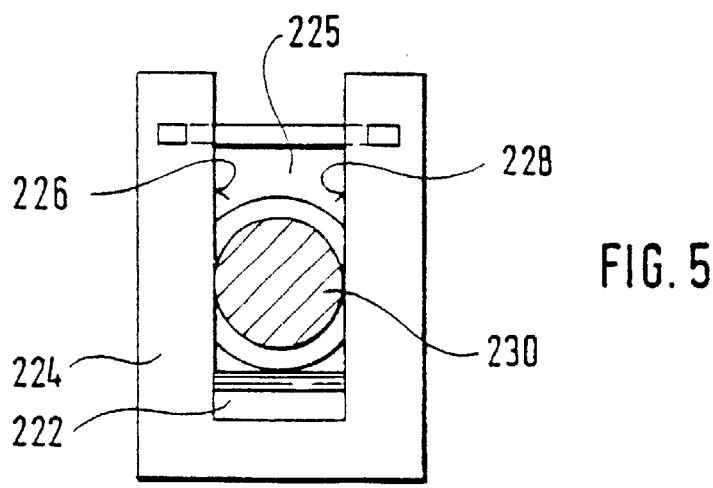

FIG. 1 shows a partial section of a schematic representation of a fixing point of a motor vehicle seat with integrated occupation detector according to the invention;

FIG. 2 a front view of a fixing bolt, a side view of which is shown in FIG. 1;

FIG. 3 a side view of an alternative embodiment of a fixing bolt;

FIG. 4 a schematic representation in partial section of an alternative embodiment of a fixing point of a motor vehicle seat with integrated occupation detector according to the invention;

FIG. 5 a section along the section line 5—5 in FIG. 4.

The part with the reference number 10 in FIG. 1 represents an upper frame of a motor vehicle seat. This upper frame 10 supports seat upholstery or a seat shell (not shown). A lower frame, which is secured to the vehicle floor 14, is designated 12. It should be noted that the upper frame 10 and lower frame 12 are only indicated schematically by fixing flanges in FIG. 1 and FIG. 4. The lower frame normally comprises a mechanism for longitudinal adjustment of the seat and the upper frame a mechanism for vertical adjustment of the seat. However, it cannot be precluded that these two mechanisms are integrated together in one of the two frames or that a mechanism, with which adjustable spring suspension of the seat can be achieved, is additionally integrated in one of the two frames.

FIG. 1 shows one of usually four fixing points between the upper frame 10 and lower frame 12. P designates the vertical weight force, which is introduced in this fixing point from the upper frame 10 via a mounting element 16 into the lower frame 12. The weight of the seat user is distributed to all fixing points depending on the seat position.

In a conventional vehicle seat the mounting elements 16 are commercially available threaded or hinge bolts. According to the present invention the mounting elements 16 are, however, designed as converters, which convert a change in the dead weight P of the seat caused by a change in seat occupation into a geometric variable measurable by a simple measuring sensor 18.

The mounting element 16 shown in FIGS. 1 and 2 comprises a shaft 20 with a thread 21 and a head 22 arranged as an axial extension of the shaft 20. The shaft 20 is pushed through a hole 23 in the lower frame 12. When tightened, a nut 24, which is screwed on to the thread 21 at the end of the shaft 20, presses a first shoulder area 26 on the head 22 against the opposite surface of the lower frame 12, so that the mounting element 16 is firmly clamped to the lower frame. A horizontal gap 28 extends from the first shoulder area 26 into the head 22, so that an unsupported arm 30 is formed. It should be noted that the shaft 20 is arranged eccentrically on the head 22, so that sufficient space remains above the shaft 20 to permit relatively rugged construction of the unsupported arm 30 in the case of a relatively small head diameter. The unsupported arm 30 is connected at the rear end of the head 22 via a flexible stirrup element 32 to an arm 34, which is in turn connected to the shaft 20. The flexible stirrup element 32 is produced in a simple way by a transverse hole 33 in the head 22, into which the gap 28 terminates parallel with the axis of the transverse hole 33.

The free end of the arm 30 forms a support 36 for the upper frame 10. For this purpose the front part of the head 22 is inserted in a bearing hole 38 in the upper frame 10, so that the latter rests on a cylindrical saddle area 39 of the support 38. A second shoulder area 40 on the arm 34 prevents lateral slipping of the upper frame 10 in relation to the lower frame 12, but does not produce any (or only negligible) pressure between the two frames 10 and 12. Hence the weight component P is introduced directly from the upper frame 10 into the unsupported arm 30, the latter and the stirrup element 32 deforming elastically. The latter parts are designed in such a way that a change in the weight component P caused by a change in the seat occupation causes a change in the opening width w of the gap 28, which can be measured without difficulty by the measuring sensor 18.

With regard to the mounting element 16 attention should be drawn to the following advantageous design details. To preclude tilting on the upper or lower frame when the unsupported arm 30 and stirrup 32 sag, the two end faces 26', 40' of this arm 30 lie further back than the corresponding shoulder areas 26, 40 on the lower arm 34. To guide the upper frame 10 at right angles to the gap 28 and always keep the unsupported arm 30 free of horizontal forces, two lateral guide areas 41', 41" are provided at the front end of the arm 34. The latter are at right angles to the gap 28 and interact with complementary areas in the bearing hole 38 in the upper frame 10 to achieve the required vertical guidance and transmission of horizontal forces. Alternatively, however, the bearing hole 38 in the upper frame 10 and the front end of the head 22 could also be fully cylindrical, i.e. designed without the vertical guide areas 41', 41". In this case the mounting element modified in this way would form a fixed pivot pin for the upper frame 10. With regard to gap 28 it should be noted that it has an opening width w, which ensures that when the seat is overloaded the support 36 rests on the arm 34 before a plastic, i.e. irreversible deformation of the arm 30 or the stirrup element 32 takes place. The risk that the conversion function of the mounting element 16 is permanently impaired by overloading of the seat is clearly reduced.

The measuring sensor 18 shown as an example in FIG. 1 is a displacement sensor, which is screwed into a hole in the arm 30. It has, for example, a probe tip 42, which rests on the lower arm 34, so that it directly measures a change in the opening width w of the gap 28. Instead of the displacement sensor 18 a strain gauge, which is affixed to the stirrup element 32 (e.g. in the transverse hole 33) and directly measures its deformation, could theoretically also be used. In most cases, however, the displacement sensor 18, which may also be designed as a simple switching element, which measures only a width less than the predetermined opening width w of the gap 18, will be the simplest and least expensive solution.

An evaluation unit, to which all displacement sensors 18 of the vehicle seat are connected, is designated 44. The airbag assigned to the vehicle seat, for example, can then be tripped via this evaluation unit 44 as a function of the weight.

FIG. 3 shows an alternative embodiment of the mounting element 16. The mounting element 116 differs from the mounting element 16 in FIGS. 1 and 2 primarily by the arrangement of two oblong holes 133', 133" in its head 122 instead of the transverse hole 33, the gap 128 terminating in the oblong hole 133'. By contrast, the oblong hole 133" reduces the flexural strength of the lower arm 134 in such a way that this arm experiences approximately the same sag as the upper arm 130 with the support 136 in the event of a load on the support 136. Consequently it is ensured that the support 136 is displaced largely parallel with itself in the event of a load, so that the risk of tilting of the two frames is greatly reduced.

With regard to the two embodiments in FIGS. 1 to 3 it should generally be noted that part 12 may represent the upper frame and part 10 the lower frame. The support 36, 136 rests under the gap 28 in a bearing hole 38 in the lower frame without any significant changes in the method of operation.

FIGS. 4 and 5 show an additional embodiment of a mounting element for a motor vehicle seat according to the invention. This mounting element 216 comprises a journal 218 and a journal bearing 220. The journal 218 is securely connected to the upper frame 210 and the journal bearing 220 to the lower frame 212. A spring element 222, on which the journal 218 rests in the journal bearing 220 (the journal bearing 220 is drawn as a longitudinal section in FIG. 4), is arranged between journal 218 and journal bearing 220. In an end wall 224 of the journal bearing 220 a vertical guide slot 225 is formed by two parallel guide surfaces 226, 228 (see FIG. 5). A cylindrical journal section 230 with reduced diameter is guided sideways in this guide slot 225. Axial guidance of the journal 218 is achieved via the two opposite shoulder areas 232, 234 on the journal 218. Consequently the journal 218 is axially blocked and vertically movable in the end wall 224 of the journal bearing 220. In other words horizontal and axial forces which act on the upper frame 210 are introduced directly into the lower frame 212 via the end wall 224 of the journal bearing 220. In the slot 225 the journal 218 can only be rotated and vertically displaced. A cap 236, which closes the journal bearing 220 at the top, prevents the journal 218 from springing out of the journal bearing 220 in the event of an accident and also protects the interior of the journal bearing 220 against dirt.

The spring element 222 is advantageously designed as a saddle-shaped support for the cylindrical end of the journal 218. For example, at least one strain gauge, which measures the elastic deformation of the spring element 222 directly, can be bonded to this saddle element. However, a displacement sensor, which detects the vertical position of the journal 218 in the journal bearing 220, for example, can also be used instead of the strain gauge.

It should also be noted with regard to FIGS. 4 and 5 that the part 212 may represent the upper frame and part 210 the lower frame. The journal bearing 220 then rests on the journal 218 by means of the spring element 222 without any significant change in the method of operation.

What is claimed:

1. Motor vehicle seat with integrated occupation detector, comprising
    an upper frame, said upper frame supporting a seat upholstery or a seat shell, and a lower frame, said lower frame being secured in the motor vehicle,
    at least one mechanical mounting element to support the upper frame in the lower frame and to introduce a weight force from the upper frame into the lower frame, said mounting element being designed so as to deform elastically under the weight of a seat user, said elastic deformation causing a vertical displacement between the upper frame and the lower frame, and
    at least one measuring sensor for measuring an elastic deformation of said mounting element, said measuring sensor comprising a switching element, said switching element measuring the vertical displacement between the upper frame and the lower frame as the exceeding of a predetermined threshold value.

2. Motor vehicle seat according to claim 1, wherein said switching element comprises several switching points, a predetermined threshold value being assigned to each switching point.

3. Motor vehicle seat according to claim 1, wherein said measuring sensor comprises several switching elements, a predetermined threshold value being assigned to reach switching element.

4. Motor vehicle seat with integrated occupation detector, comprising an upper frame, said upper frame supporting a seat upholstery or a seat shell, and a lower frame, said lower frame being secured in the motor vehicle,
    at least one mechanical mounting element to support the upper frame in the lower frame and to introduce a weight force from the upper frame into the lower frame, said mounting element being designed so as to deform elastically under the weight of a seat user, and at least one measuring sensor for measuring an elastic deformation of said mounting element, wherein said mounting element is designed as a stirrup having a first and a second arm, wherein a free end of said first arm is securely connected to a first one of said upper frame and said lower frame, and a free end of the second arm forms a support for a second one of said upper frame and said lower frame, and wherein said stirrup is designed in such a way that an opening width of the stirrup changes elastically under the weight of a seat user.

5. Motor vehicle seat according to claim 4, wherein said free end of the second arm is separated from said first arm by a gap, said opening width of this gap being dimensioned in such a way that the support rests on the first arm before plastic deformation of the stirrup takes place.

6. Motor vehicle seat according to claim 5, wherein said first and second arms are designed in such a way that they exhibit essentially the same bending deformation in the event of vertical loading of the support.

7. Motor vehicle seat according to claim 4, wherein said measuring sensor comprises a strain gauge, said strain gauge being mounted on said stirrup in such a way that said strain gauge directly measures a deformation of said stirrup.

8. Motor vehicle seat according to claim 4, wherein said measuring sensor comprises a displacement sensor, said displacement sensor for measuring a vertical displacement between said first arm of said stirrup and said second arm of said stirrup.

9. Motor vehicle seat according to claim 4, wherein said measuring sensor comprises a switching element, said switching element measuring the change of the opening width of the stirrup as the exceeding of a predetermined threshold value.

10. Motor vehicle seat according to claim 9, wherein said switching element comprises several switching points, a predetermined threshold value being assigned to each switching point.

11. Motor vehicle seat according to claim 9, comprising several switching elements, a predetermined threshold value being assigned to each switching element.

12. Motor vehicle seat with integrated occupation detector, comprising an upper frame, said upper frame supporting a seat upholstery or a seat shell, and a lower frame, said lower frame being secured in the motor vehicle, at least one mechanical mounting element to support the upper frame in the lower frame and to introduce a weight force from the upper frame into the lower frame, said mounting element being designed so as to deform elastically under the weight of a seat user, and at least one measuring sensor for measuring an elastic deformation of said mounting element, wherein said mounting element comprises a shaft, said shaft being securely connected to a first one of said upper frame and said lower frame, and a head, said head being arranged as an axial extension of the shaft, wherein said head forms a first shoulder area and wherein a gap extends from the first shoulder area into the head in such a way that a cantilevered arm is formed, said cantilevered arm having a free end forming a support for a second one of said upper frame and said lower frame, an opening width of said gap changing elastically under the weight of a seat user.

13. Motor vehicle seat according to claim 12, wherein said head comprises a horizontal transverse hole, said transversal hole causing a flexible stirrup element to be formed at an end of said head, said flexible stirrup element connecting the cantilevered arm to an arm which is in turn connected rigidly to the shaft.

14. Motor vehicle seat according to claim 13, wherein the head comprises horizontal oblong holes at a rear end, said gap terminating in one of these oblong holes, and wherein the oblong holes are arranged in such a way that the support undergoes a parallel displacement under the weight of a seat user.

15. Motor vehicle seat according to claim 12, wherein said head is offset in relation to the shaft.

16. Motor vehicle seat according to claim 12, wherein said measuring sensor comprises a strain gauge, said strain gauge being mounted on said head of said mounting element in such a way that said strain gauge directly measures a deformation of said head.

17. Motor vehicle seat according to claim 12, wherein said measuring sensor comprises a displacement sensor, said displacement sensor for measuring a vertical displacement of said free end of said cantilevered arm.

18. Motor vehicle seat according to claim 12, wherein said measuring sensor comprises a switching element, said switching element measuring the change of the opening width of said gap as the exceeding of a predetermined threshold value.

19. Motor vehicle seat according to claim 18, wherein said switching element comprises several switching points, a predetermined threshold value being assigned to leach switching point.

20. Motor vehicle seat according to claim 18, comprising several switching elements, a predetermined threshold value being assigned to each switching element.

21. Motor vehicle seat with integrated occupation detector, comprising an upper frame, said upper frame supporting a seat upholstery or a seat shell, and a lower frame, said lower frame being secured in the motor vehicle, at least one mechanical mounting element to support the upper frame in the lower frame and to introduce a weight force from the upper frame into the lower frame, said mounting element being designed so as to deform elastically under the weight of a seat user, and at least one measuring sensor for measuring an elastic deformation of said mounting element, wherein said mounting element comprises a journal and journal bearing, the journal being securely connected to a first one of said upper and lower frame, the journal bearing being securely connected to a second one of said upper and lower frame and a resilient means being arranged between the journal and the journal bearing.

22. Motor vehicle seat according to claim 21, wherein the journal bearing comprises a vertical guide slot for the journal.

23. Motor vehicle seat according to claim 22, wherein said journal is blocked against axial displacement in the journal bearing.

24. Motor vehicle seat according claim 21, wherein said resilient means comprises a saddle-shaped spring element, said saddle-shaped spring element forming a support for a cylindrical end of the journal.

25. Motor vehicle seat according to claim 21, wherein said measuring sensor comprises a strain gauge, said strain gauge being mounted on said resilient means of said mounting element in such a way that said strain gauge directly measures a deformation of said resilient means.

26. Motor vehicle seat according to claim 21, wherein said measuring sensor comprises a displacement sensor, said displacement sensor for measuring a vertical displacement of journal with respect to said journal bearing.

27. Motor vehicle seat according to claim 21, wherein said measuring sensor comprises a switching element, said switching element measuring the vertical displacement of the journal with respect to said journal bearing as the exceeding of a predetermined threshold value.

28. Motor vehicle seat according to claim 27, wherein said switching element comprises several switching points, a predetermined threshold value being assigned to each switching point.

29. Motor vehicle seat according to claim 27, comprising several switching elements, a predetermined threshold value being assigned to each switching element.

* * * * *